April 5, 1955 R. KAISER 2,705,652
BREAKAWAY COUPLING
Filed Sept. 29, 1951
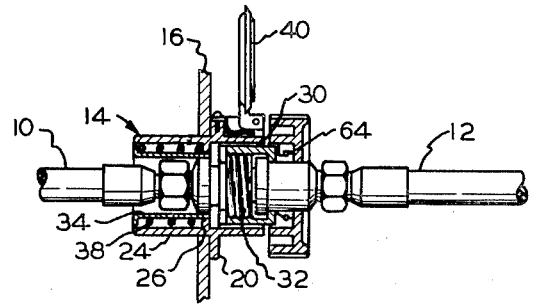
Fig. I
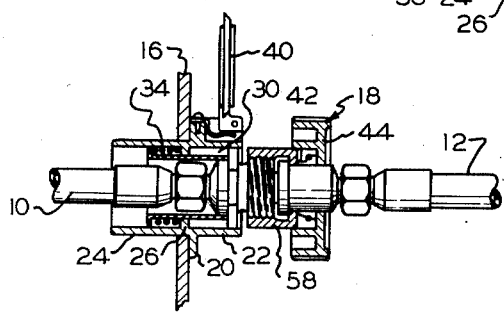
Fig. II
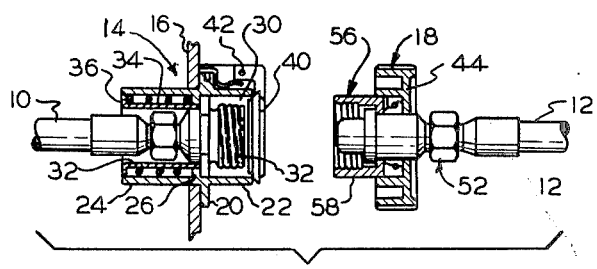
Fig. VII Fig. III
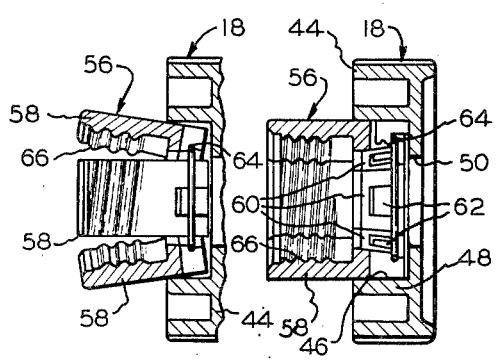
Fig. VI Fig. IV
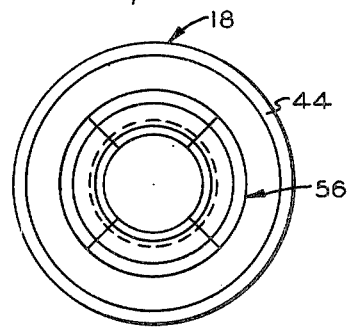
Fig. V
INVENTOR
RUDOLF KAISER
BY *Truman F. Beaman*
ATTORNEY

# United States Patent Office 2,705,652
Patented Apr. 5, 1955

2,705,652

BREAKAWAY COUPLING

Rudolf Kaiser, Ettlingen, Baden, Germany, assignor to Aeroquip Corporation, Jackson, Mich., a corporation of Michigan Application September 29, 1951, Serial No. 248,977

1 Claim. (Cl. 285—150)

This invention relates to joints of the type which involve a screwed stud and socket connection and in particular to hose and coupling assemblies incorporating such screwed joint connections.

In connection with such joints it is desirable in fluid hose and coupling assemblies in particular that whereas the joint should be capable of being made by screw action, that is by screwing the screwed stud and socket together, the joint should be capable of being broken upon one of the joint parts being subjected to a predetermined linear pulling force relatively to the other part.

It is thus an object of this invention to provide a screwed stud and socket joint assembly which is capable of being made by rotary screw action but which can be automatically broken when the one screwed joint part is subjected to a linear pulling force relatively to the other screwed joint part, to the exclusion of any rotary motion.

This and other objects and advantages of the invention, residing in the construction, arrangement and combination of parts will be more fully disclosed and will be apparent to those skilled in the art from a consideration of the following description and the appended claims, with reference to the accompanying drawings, in which:

Fig. I is a side elevation view, partly in section, of one form of the invention, as applied to a fluid hose and coupling assembly, with the screwed joint parts in coupled condition, Fig. II is a similar view to Fig. I but showing the coupling parts about to separate, by the exertion of a linear pulling force upon one of the coupling parts, in the direction of the arrow, Fig. III is a part sectional side elevation of the finally separated coupling parts, Fig. IV is a vertical section of the screwed socket part, with the socket sections shown closed, Fig. V is a view looking on the right-hand end of Fig. IV, Fig. VI is a similar view to Fig. IV but showing the socket segments sprung outwardly, and Fig. VII is a detail view of one of the screw-socket segments.

Referring to the drawings, 10, 12 represent a pair of fluid hose sections, of which one has a coupling part, indicated generally at 14, mounted upon a wall 16, and the other has a mating coupling part, indicated generally at 18.

Each coupling part is to be assumed as incorporating hose end fittings and self-sealing valve means for closing the ends of their respective hose ends upon separation of the coupling parts, in the manner well-known in the self-sealing coupling art.

The one coupling part 14 comprises an outer sleeve with an external flange 20 secured upon the wall 16 and defining sleeve portions 22 and 24 projecting from opposite sides of said wall, said sleeve also having an internal flange 26 defining sleeve bore portions 28 and 30.

The hose 10 has an externally screwed stud part 32 secured upon the end therof presented to the coupling part 14, which screwed stud is retained by the flange 26 for axial sliding movement in the bore portion 30 and carries a sleeve extension 34 which is slidable in the other bore portion 28. This sleeve extension has an end flange 36 between which, and the flange 26, there is a coil spring 38 mounted about the sleeve extension 34 and serving constantly to urge the externally screwed stud part to the left, as seen in the drawings, against the flange 26. In this position, the outer end of the screwed stud part 32 is spaced inwardly with respect to the corresponding and open end of the sleeve portion 22, as seen in Fig. III.

The sleeve portion 30 has a cap 40 pivoted upon its outer end, as indicated at 42, and capable of being swung to open and closed positions with respect to the open end of said sleeve portion.

The other coupling part 18 comprises a body part 44, which may be of circular handle formation, as shown, or may be otherwise shaped, as in the form of a wing-nut, to facilitate grasping and has a central circular recess 46, defined by the annular flange 48, and a central opening 50 through which the coupling end fitting of the hose 12, and indicated generally at 52, extends into and through the center of the recess 46. This end fitting has a cylindrical portion 54, about which end portions of a segmental internally screwed socket assembly, indicated generally at 56, are mounted in circular arrangement and so that the main finger portions 58 of these segments extend axially with respect to the coupling body part 18 and may be presented in socket formation over the externally screwed stud part 32.

The individual screwed socket segments 56 have end portions 60 of channel shape, as seen in Fig. IV, which are fitted over circumferentially spaced lugs 62 on the interior of the internal flange 48 of the body part 18 and are retained in position by a split spring ring 64 which is held located behind the lugs 62, as seen particularly in Fig. IV. The spring ring 64 serves flexibly to hold the screwed segments 56 in circular cylindrical assembly but permits the individual segments to be moved outwardly, as seen in Fig. VI, against the action of the spring ring.

The tips of the internal threads 66 of the segments 56 are shown of rounded formation, for the purpose to be described.

To effect the desired coupling together of the hose sections 10 and 12, and referring to Fig. III, the cap 40 is swung to open position, as seen in Figs. I and II, and the screwed socket introduced into the sleeve 22. Since the receiving end of the screwed stud 32 is inwardly located with respect to the open end of the sleeve 22 the socket segments 56 will be confined within the sleeve prior to the engagement of the threads 66 with the screwed stud. This sleeve, therefore, positively prevents the segments from springing outwardly from the very commencement of the screwing-on operation and serves positively to prevent any outward deflection of the segments throughout the time that the socket is being screwed home onto the stud 32 and while the parts are thus held screwed together, it being appreciated, also, that the spring 64 will be of sufficient initial tension as to impart rigidity to the segment assembly such that the segments will not readily deflect outwardly from their normal axial positions.

In order to disconnect the coupling, or when the coupled hose sections are subjected to a pulling-apart action by a linearly applied force, the hose section 12 will be pulled in the direction of the arrow in Fig. II. This, in the first part of the pulling movement, will cause the screw coupled parts 56, 32 and the sleeve extension 34, as well as the body part 18, to slide as a unit to the right within the sleeve part 22, at the same time compressing the coil spring 38. During this part of the linear pulling motion the screwed-together parts will remain united due to the presence of the sleeve 22. When, however, the pulling force has been applied to such extent as to cause the parts to reach the position of Fig. II, the sleeve 22 is no longer effective to prevent outward deflection of the segments 58 against the action of the spring ring 64. At this time, therefore, continued pull on the socket segments 56 will result in the segments being sprung outwards by the camming action between the socket teeth 66 and the stud teeth, thereby releasing the screwed connection and freeing the coupling parts to separate, as seen in Fig. III, with the spring 38 operating instantly to restore the screwed stud 32 and sleeve 34 to its initial position, as seen in Fig. III, ready for the next coupling operation.

It will be appreciated, therefore, that this coupling assembly permits the coupling to be made with the advantages of a rotary screwing action but obviates the necessity of employing such action to uncouple the parts, when it is desired that this should be effected rapidly and automatically upon the application of a linearly applied pulling apart action to the coupled parts. At the same time the sleeve 22 serves positively to hold the coupled screw socket segments 56 against spreading outwards unintentionally and enables the coupled hose sections to convey high pressure fluids.

The pulling apart of the hose section 12 from the hose section 10 can be effected by manual effort applied to the body part 18, which, as stated, may be formed as a wing nut to facilitate grasping by the operator's hand.

Having thus described the invention, what is claimed as novel and it is desired to cover by Letters Patent is as follows:

In a coupling, a pair of coupling parts, one said part comprising an outer sleeve having means for securing the sleeve to a relatively fixed part, said sleeve having an internal flange defining sleeve bore portions upon opposite sides of the flange, a hollow stud part having exterior screw-threading, means for connecting said stud part to one end of a length of hose, means mounting said stud part for axial reciprocatory motion in one of said sleeve bore portions, and including a sleeve extension slidable in the other sleeve bore portion, spring means operatively connected with said sleeve extension for normally urging said stud part to position in which it is completely enclosed within its corresponding said sleeve bore portion, said internal sleeve flange forming a stop for arresting said stud in said position, said other coupling part comprising a body part having a central circular recess defined by an annular flange and having a central opening through which an end fitting on another length of hose is capable of being passed to extend into said recess, said end fitting having a cylindrical portion, a segmental internally screw-threaded socket assembly, means mounting said assembly in circular arrangement upon said cylindrical end fitting portion so that said socket assembly is capable of being screwed upon said stud on the other coupling body part, said mounting means including spring means enabling said segments to spread outwards at the ends thereof presented to said stud but normally constraining said segments into their internally screw-threaded socket arrangement, the wall of said sleeve bore portion in which said stud is normally contained restraining said segments in their said arrangement until said segment ends are removed from said bore portion by an axial force applied to the connected stud and stocket.

References Cited in the file of this patent

UNITED STATES PATENTS

| 2,226,914 | Sharon | Dec. 31, 1940 |
| 2,259,137 | Iftiger | Oct. 14, 1941 |
| 2,327,714 | Iftiger | Aug. 24, 1943 |